US011868596B2

(12) United States Patent
Maiman et al.

(10) Patent No.: US 11,868,596 B2
(45) Date of Patent: Jan. 9, 2024

(54) COLOR-BASED SYSTEM FOR GENERATING NOTIFICATIONS

(71) Applicant: Capital One Services, LLC, McLean, VA (US)

(72) Inventors: Tyler Maiman, Melville, NY (US); Kathryn Tikoian, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/386,861

(22) Filed: Jul. 28, 2021

(65) Prior Publication Data

US 2023/0033212 A1 Feb. 2, 2023

(51) Int. Cl.
*G06F 3/04845* (2022.01)
*G06F 21/31* (2013.01)
*G06F 3/04842* (2022.01)

(52) U.S. Cl.
CPC ...... *G06F 3/04845* (2013.01); *G06F 3/04842* (2013.01); *G06F 21/31* (2013.01)

(58) Field of Classification Search
CPC ... G06F 3/04842; G06F 3/04845; G06F 21/31
See application file for complete search history.

(56) References Cited

U.S. PATENT DOCUMENTS

| | | | | |
|---|---|---|---|---|
| 5,883,627 A * | 3/1999 | Pleyer | ................. | G06F 3/04817 715/977 |
| 6,429,868 B1 * | 8/2002 | Dehner, Jr. | ........... | G06T 11/206 345/440 |
| 7,162,526 B2 * | 1/2007 | Dutta | .................... | H04L 67/306 715/208 |
| 8,954,521 B1 * | 2/2015 | Faaborg | ................ | H04L 51/046 709/206 |
| 10,319,116 B1 * | 6/2019 | C | ............................ | G09G 5/377 |
| 10,552,839 B2 * | 2/2020 | Narasimhan | ........... | G06Q 40/02 |
| 10,755,030 B2 * | 8/2020 | Hamlin | ................. | G06F 40/186 |
| 10,841,839 B2 * | 11/2020 | Raleigh | ................. | H04W 28/02 |
| 11,061,372 B1 * | 7/2021 | Chen | ..................... | G06F 3/0487 |
| 11,302,285 B1 * | 4/2022 | Grundhoefer | .......... | G09G 5/026 |
| 2004/0183799 A1 * | 9/2004 | Hao | ....................... | H04L 43/045 345/440 |
| 2005/0165680 A1 * | 7/2005 | Keeling | ................. | G06Q 20/02 705/40 |
| 2006/0105354 A1 * | 5/2006 | Remacle | ............ | G01N 21/6428 435/6.15 |
| 2007/0033129 A1 * | 2/2007 | Coates | ................... | G06Q 40/06 705/36 R |

(Continued)

*Primary Examiner* — Jeremy L Stanley
(74) *Attorney, Agent, or Firm* — Banner & Witcoff, Ltd.

(57) ABSTRACT

A computing device may determine that a condition exists with respect to a user of an application. Based on the determined condition, the computing device may determine an action for the user to perform via the application, and an associated importance level of the action. The computing device may identify a user interface element of the application that is associated with the action and a color that is associated with the importance level. The computing device may change the appearance of the identified user interface element such that the user interface element has the color that is associated with the importance level of the action.

20 Claims, 7 Drawing Sheets

(56) References Cited

U.S. PATENT DOCUMENTS

| | | | | |
|---|---|---|---|---|
| 2008/0270164 A1* | 10/2008 | Kidder | G06Q 30/0241 | 705/14.4 |
| 2009/0006609 A1* | 1/2009 | Lindberg | H04M 1/72427 | 715/752 |
| 2009/0158192 A1* | 6/2009 | De Peuter | G06F 9/451 | 715/776 |
| 2009/0263016 A1* | 10/2009 | Kuo | H04N 1/6027 | 382/167 |
| 2009/0309894 A1* | 12/2009 | Lam | G06F 40/103 | 358/1.18 |
| 2010/0049664 A1* | 2/2010 | Kuo | G06Q 40/00 | 705/36 R |
| 2010/0182327 A1* | 7/2010 | Zhou | G06T 13/80 | 345/473 |
| 2011/0208048 A1* | 8/2011 | Arima | A61B 6/545 | 600/436 |
| 2011/0252132 A1* | 10/2011 | Wetzer | G06F 9/542 | 709/224 |
| 2011/0289451 A1* | 11/2011 | Fischer | G06F 9/451 | 715/808 |
| 2012/0072844 A1* | 3/2012 | Lefrancois des Courtis | G06Q 30/02 | 709/204 |
| 2012/0075327 A1* | 3/2012 | Mackenzie | G06F 3/04883 | 345/589 |
| 2012/0127198 A1* | 5/2012 | Gundavarapu | G06F 3/14 | 345/629 |
| 2012/0201479 A1* | 8/2012 | Zhang | G06T 3/4038 | 382/284 |
| 2012/0239420 A1* | 9/2012 | Stapelfeldt | G16H 50/20 | 705/2 |
| 2013/0041590 A1* | 2/2013 | Burich | G16H 40/63 | 702/19 |
| 2013/0111333 A1* | 5/2013 | Taleghani | G06F 40/103 | 715/252 |
| 2014/0040454 A1* | 2/2014 | Ramsey | G16H 10/60 | 709/224 |
| 2014/0129661 A1* | 5/2014 | Thyagaraja | H04L 51/24 | 709/207 |
| 2014/0237042 A1* | 8/2014 | Ahmed | H04L 67/36 | 709/204 |
| 2014/0282122 A1* | 9/2014 | Mathur | G06F 3/0482 | 715/762 |
| 2014/0297758 A1* | 10/2014 | Kidron | G01C 21/3492 | 709/206 |
| 2014/0365886 A1* | 12/2014 | Koenig | G06F 3/04855 | 715/711 |
| 2015/0029013 A1* | 1/2015 | Osornio Lopez | G06V 20/597 | 340/438 |
| 2015/0186918 A1* | 7/2015 | Clarke | G06Q 20/405 | 705/14.23 |
| 2015/0193866 A1* | 7/2015 | Van Heerden | G06Q 40/02 | 705/35 |
| 2015/0193867 A1* | 7/2015 | Del Vecchio | G06Q 40/02 | 705/39 |
| 2015/0193868 A1* | 7/2015 | Del Vecchio | H04L 67/10 | 705/35 |
| 2015/0193869 A1* | 7/2015 | Del Vecchio | G06Q 40/02 | 705/42 |
| 2015/0223200 A1* | 8/2015 | Kim | H04W 68/02 | 455/458 |
| 2015/0312182 A1* | 10/2015 | Langholz | G06F 3/0488 | 715/753 |
| 2016/0057154 A1* | 2/2016 | Ferguson | H04L 63/104 | 715/741 |
| 2016/0065732 A1* | 3/2016 | Davis | H04M 3/51 | 379/265.02 |
| 2016/0117057 A1* | 4/2016 | Smolinski | G06F 3/0481 | 715/781 |
| 2016/0117651 A1* | 4/2016 | Davis | G06Q 20/3255 | 705/40 |
| 2016/0117666 A1* | 4/2016 | Davis | G06Q 20/384 | 705/39 |
| 2016/0117670 A1* | 4/2016 | Davis | G06Q 20/386 | 705/39 |
| 2016/0117765 A1* | 4/2016 | Koeppel | G06T 11/001 | 705/35 |
| 2016/0142407 A1* | 5/2016 | Chun | H04L 63/0861 | 726/5 |
| 2016/0147713 A1* | 5/2016 | Ni | G06T 3/40 | 345/660 |
| 2016/0149838 A1* | 5/2016 | Jeong | G06F 3/0488 | 715/753 |
| 2016/0167513 A1* | 6/2016 | Arita | B60K 35/00 | 340/441 |
| 2016/0183864 A1* | 6/2016 | Kusens | A61B 5/11 | 340/573.1 |
| 2016/0246491 A1* | 8/2016 | Wu | G06F 3/04847 | |
| 2016/0283909 A1* | 9/2016 | Adiga | G06Q 10/1095 | |
| 2016/0378270 A1* | 12/2016 | Lee | G06F 1/1624 | 715/788 |
| 2017/0011398 A1* | 1/2017 | Narasimhan | G06Q 20/108 | |
| 2017/0041769 A1* | 2/2017 | Shim | H04B 1/385 | |
| 2017/0162168 A1* | 6/2017 | Lopez | B60K 37/02 | |
| 2017/0220240 A1* | 8/2017 | Kataria | G06F 3/0488 | |
| 2017/0243170 A1* | 8/2017 | Rashid | H04W 4/021 | |
| 2017/0285878 A1* | 10/2017 | VanBlon | G06F 3/04817 | |
| 2018/0101901 A1* | 4/2018 | Jones-McFadden | G06Q 40/02 | |
| 2018/0121035 A1* | 5/2018 | Filippi | G06F 40/169 | |
| 2018/0189874 A1* | 7/2018 | Annett | G06Q 40/04 | |
| 2018/0217968 A1* | 8/2018 | Bastide | G06F 40/151 | |
| 2018/0350453 A1* | 12/2018 | Nag | G06F 3/0484 | |
| 2019/0073113 A1* | 3/2019 | Yang | G06F 3/04847 | |
| 2019/0129520 A1* | 5/2019 | Shin | G06T 7/40 | |
| 2019/0340700 A1* | 11/2019 | Haas | G06F 3/0482 | |
| 2020/0013389 A1* | 1/2020 | Ukai | G06F 40/268 | |
| 2020/0014770 A1* | 1/2020 | Jones-McFadden | G06Q 40/02 | |
| 2020/0159804 A1* | 5/2020 | Van Rotterdam | G06T 11/001 | |
| 2020/0228642 A1* | 7/2020 | Choi | H04M 1/72472 | |
| 2020/0349648 A1* | 11/2020 | Cosmano | G06F 16/9024 | |
| 2020/0379889 A1* | 12/2020 | Hamid | G06F 11/3684 | |
| 2020/0387411 A1* | 12/2020 | Chu | H04L 51/24 | |
| 2021/0158586 A1* | 5/2021 | Castellucci | G06T 11/60 | |
| 2021/0349757 A1* | 11/2021 | Qiao | G06Q 10/10 | |
| 2022/0121723 A1* | 4/2022 | Page | G06F 11/3684 | |
| 2022/0122087 A1* | 4/2022 | Gosset | H04L 63/08 | |

* cited by examiner

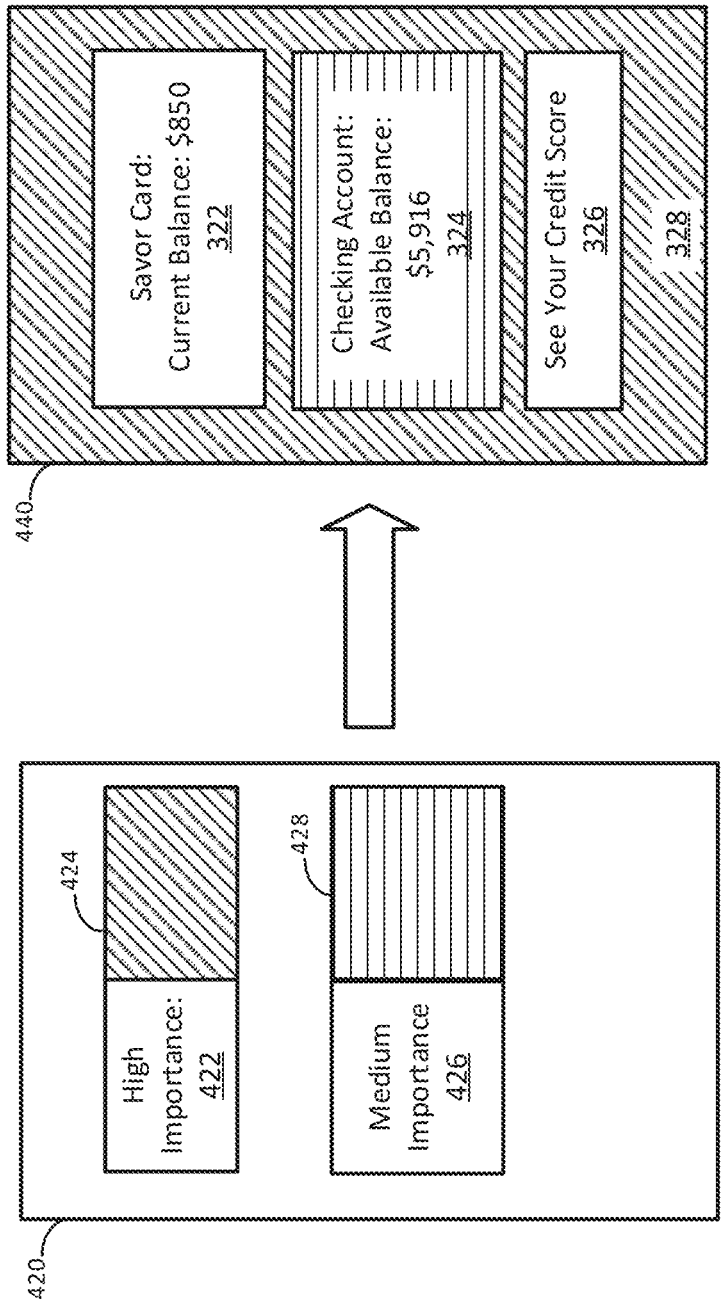

COLOR-BASED SYSTEM FOR GENERATING NOTIFICATIONS

TECHNICAL FIELD

The present disclosure is generally related to generating notifications in a software application.

BACKGROUND

An application executing on a computer-based system may output a graphical user interface (GUI), which the computing device may output for display. Such a GUI may include various user interface (UI) elements, such as screens, windows, dialogs, etc. Such an application may be configured to allow user interaction with respect some or all of these elements, for instance based on one or more received user inputs.

In some instances, an application may cause display of many such UI elements. Because so many UI elements may be displayed, a user may not be able to quickly identify, or navigate to, user interface elements that may require the user's attention. Accordingly, an application may be configured to perform various techniques to direct a user's attention to a particular user interface element. For example, if an application determines that an event or condition has occurred that may require a user's attention, the application may generate a notification, which may attempt to draw a user's attention to the application or a particular display screen of the application. A user may view the notification, and based on the notification, may take an action based on the notification.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding methods, apparatuses, systems, and computer-readable media are also within the scope of the disclosure.

Systems described herein provide a computing device that may be configured to execute an application. The application may cause a GUI to be displayed on the same computing device, or a different computing device, such as a client device. At a high level, such an application may be configured to identify a user of the application, determine a condition that exists with respect to the user, and to determine an action, associated with the condition, for the user to take with respect to the application. Based on the condition and determined user action, the application may change the appearance of one or more UI elements.

The condition associated with the user may take various forms. For example, in the context of a financial application, such a condition may be an unpaid balance on a credit card, a change in a user's credit score, an unpaid balance, a bill coming due, and/or any other condition that may exist within such a financial application and which may be associated with a user. Such a condition may take various other forms as well. Based on the condition, the application may determine an action for the user to take via the application and with respect to the condition.

An application that a user may take with respect to an application may take various forms. For example, in the context of such a financial application in which the application determines that the user has an unpaid balance, the action may be the user viewing a message indicating that the balance is unpaid. For a given determined condition and/or action that the user is to take, the application may determine an importance of the application and/or condition. Example levels of importance may comprise, high, medium, or low levels of importance, as some examples. Such levels of importance may take various other forms as well.

Based on the determined condition, the application may identify a UI element that is associated with the action. As an example, the application may identify a background UI element based on the background being associated with the action comprising the user viewing a message indicating the unpaid balance. Based on the importance of the action, the application may determine an associated color. For instance, the application may determine that a red color is associated with actions having high importance. Based on viewing the unpaid balance having a high importance, the application may associate the red color with the requested user action. The application may apply (e.g., change the color of) the user element associated with the user action from its default color to the determined color. In this example, the application may change the color of the background UI element from a default gray color to the red color associated with the high importance level of the user action.

The application may also monitor actions that the user takes with respect to the application to determine whether the user has taken an action that is associated with a UI element. If user has taken an action, such as viewing the unpaid balance message in this example, the application, the application may again modify the color of the UI element associated with the requested user action. For example, if the UI element is a background UI element, the application may remove the previously-applied red color from the background UI element and revert the background element to its default gray color. UI element modifications, such as removing a color, may indicate to the user that the associated action has been taken.

In some instances, even though a user has been indicated by modifying the appearance of a UI element, the user may not take the indicated action. For example, the user may not identify that the appearance of a UI element has changed, and may not take the indicated action. Or, as another example, the user may choose not to perform the indicated action. In such a case in which the user does not take the indicated action, the appearance of the UI element may be further modified in order to draw the user's attention to the action. For example, if the color of a UI element has been modified to indicate a user action, the appearance of the UI element may be further modified to emphasize the action. For instance, if the background UI element has previously been changed to red, and the user has not taken the indicated action, the application may change the background UI element color to a more intense red color to further emphasize the action.

As compared to existing notification-based technique, the techniques of this disclosure may more quickly allow users to identify UI elements with which a user should interact and actions that a user should take with respect to an application. Additionally, changing the color of such user elements may allow a user to more quickly identify: (1) the requested action for the user to take with respect to the application, and/or (2) importance of that application that is to be taken. Further, the continued persistence of such a modified UI element color may serve as a reminder to the user that the requested action has not been taken. By comparison, existing notification techniques may not continue to indicate an action after a user has viewed or interacted with the notification. As yet another advantage, the removal of such UI coloration may signal to the user that the user has completed the previously-indicated action, whereas existing notification techniques may not provide any indication that a user has completed a requested action.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 4A shows an example of an application GUI in accordance with one or more aspects described herein;

FIG. 4B shows an example of an application GUI in accordance with one or more aspects described herein;

DETAILED DESCRIPTION

Figure 1:
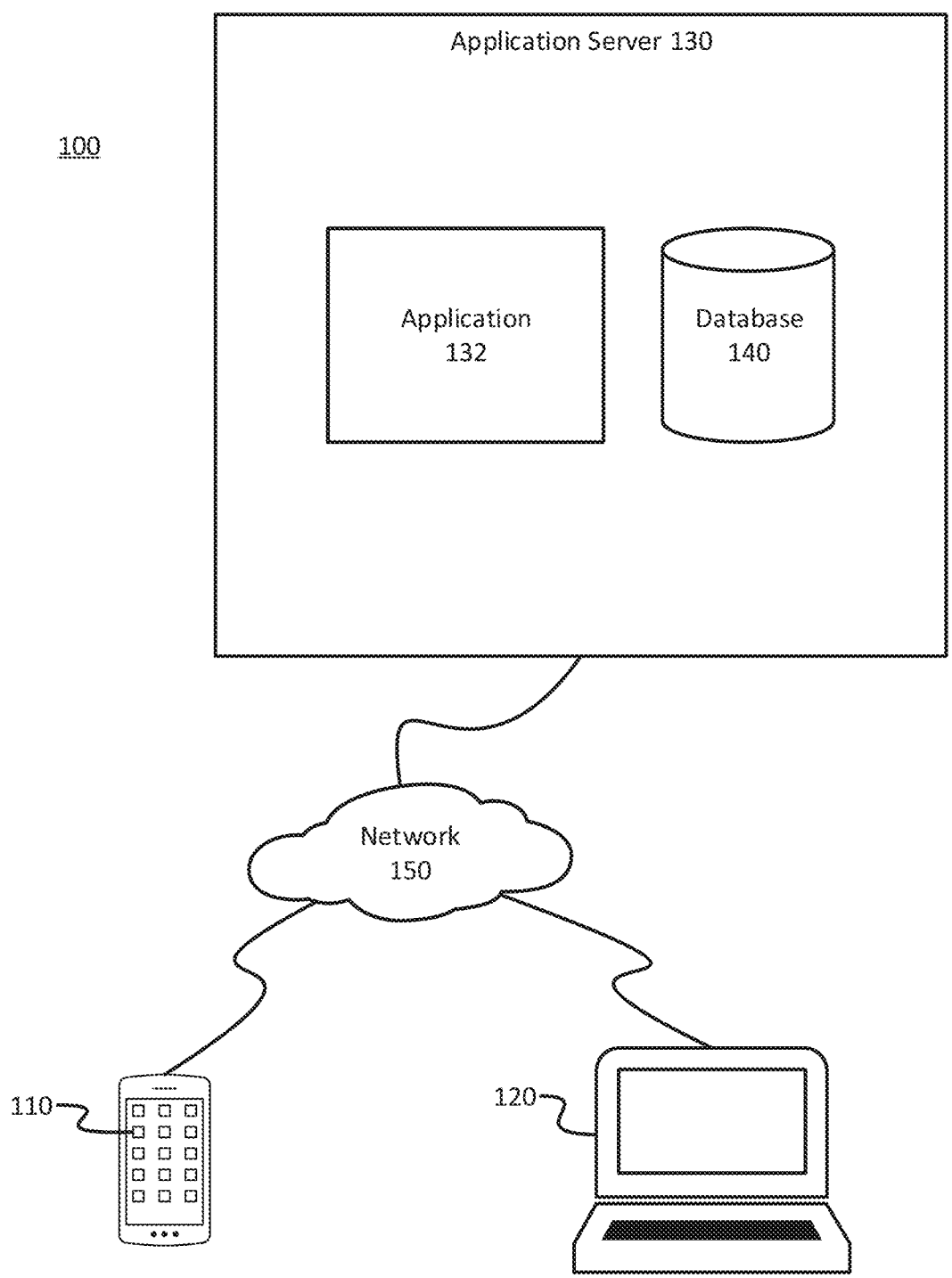
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and for computer-based systems that are configured to execute applications. Such applications may be configured to generate GUIs, which may be output for display at a computing device. As explained above, such UIs may comprise one or more UI elements, such as display screens, images, windows, dialogs, text, input elements (e.g., UI elements that may accept user input), etc.

Such an application may be configured to output multiple one or more display screens, such as windows, tabs, etc. Each of these display screens may be user-navigable and may comprise multiple UI elements. Some or all of the multiple UI elements may be selectable by a user based on a user input. If the application determines that such a UI element has been selected, the application may be configured to take an action, such as causing display output. For example, such an application may comprise a financial application that may output information related to a user's financial information, such as the user's financial accounts, bills, credit scores, etc. The financial application may be configured to output display screens, each of which may comprise multiple UI elements. These UI elements may be associated with such financial information. In such an example, a user may select a UI element that is associated with a pending bill. Based on the UI element selection, the application may generate and cause output of a display screen comprising information associated with the unpaid bill.

However, such an application display screen may comprise many display screens and each display screen may comprise many UI elements. Because there may be many display screens within a given application, a user may not be able to identify, and/or quickly navigate to a display screen having important content for the user to review. Further, given the large number of user interface elements within a display screen, it may not be clear to the user if an action should be taken with respect to the application. For example, a user may be logged into an application. The application may determine that a condition has occurred, and that that a user should take an action to address the condition. Based on the existence of the condition and action, the application may generate a notification.

Existing notification techniques may briefly draw a user's attention. However, such existing notification techniques, including popups, fail to indicate: an action that the user should take with respect to the application, an importance level associated with the indicated action, and/or an indication that the user has completed the action.

In the case of the above-described financial application, the notification may cause the computing device to display a main screen of the application, which may include UI elements corresponding the user's financial accounts, as an example. However, content related to the user's unpaid bill may not be shown on a different application screen, and may not be visible to the user from the main screen. But, because the user may not see the display screen associated with the unpaid bill, the user may not see the indication, and therefore may not perform the requested action, in this case, viewing the unpaid bill.

Because existing notification techniques fail to indicate actions that a user is to perform, users may frequently fail to perform actions that may be requested of the user. And, if a user fails to perform such requested user actions, there may be significant consequences for the user. For instance, if the user has an unpaid bill, misses a notification indicating the unpaid bill, and does not pay the bill, the user may be financially penalized. The financial penalty may be in the form of an additional late payment fee, and/or a reduction of the user's credit score, as some examples. Additionally, even if a notification does eventually cause a user to perform a requested action, the application may not provide an indication to the user that the user has completed the action.

The techniques of this disclosure solve these aforementioned problems by configuring an application to change the appearance of one or more application UI elements to indicate an a request for the user to take with respect to an application, and an associated importance of the requested action. Changing the appearance of such UI elements may comprise changing the color of a UI element, and/or otherwise modifying a UI element's appearance. Changing the appearance of such UI elements may also involve the application reverting a color of a UI element back to its original (e.g., default) appearance based on the user having completed the indicated action. Reverting the appearance of such a UI element may indicate to the user that the user has completed the requested action.

Operating Environments and Computing Devices

FIG. 1 shows an operating environment 100. The operating environment 100 may include at least user client device 110, client device 120, and application server 130, in communication via a network 150. It will be appreciated that the network connections shown in relation to network 150 are illustrative and any means of establishing a communications link between the computers may be used. The existence of any of various network protocols such as TCP/IP, Ethernet, FTP, HTTP and the like, and of various wireless communication technologies such as Bluetooth, GSM, CDMA, 3GPP protocols, WiFi, LTE, and/or 5G, is presumed, and the various computing devices described herein may be configured to communicate using any of these network protocols or technologies. Any of the devices and systems described herein may be implemented, in whole or in part, using one or more computing systems described with respect to FIG. 2.

Client devices 110, 120 may execute, provide data to, and/or interact with the applications described herein. Examples of client devices 110 and 120 may comprise computing devices, such as smartphones, tablets, laptops, wearable devices, or various other forms of computing devices as well. Access to application server 130 or resources thereof may be restricted to certain ones of client devices 110, such as client devices that provide certain credentials for authenticating users of those client devices.

Application server 130 may comprise one or more devices, which may include processors and/or memory, that may be configured to execute a variety of different applications and/or components that may use the color-based notification techniques of this disclosure. Application server 130 may comprise components and/or associated applications such as application 132, and/or database 140.

Application 132 may execute on application server 130. Application 132 may comprise a web application, mobile application, or any other type of application. While application 132 is illustrated as executing on application server 130, it should be understood that application 132 may partially execute on application server 130, and/or on client devices 110, 120. For example, application 132 may comprise a web application that may be rendered by a web browser executing on client devices 110, 120. In this manner, application 132 may deliver a web-based payload to client devices 110, 120.

If application 132 partially executes on a client device, application 132 application may receive data from a component of application 132 executing on application server 130, such as a back-end component. As another example, application 132 may be a standalone application that does not communicate with application server 130. Application 132 may be distributed, and/or execute on other devices as well. According to various examples, application 132 may comprise a desktop application, mobile application, web application, or a combination thereof. In some examples, application 132 may be configured as a browser extension that may execute in conjunction with a web browser. Such a web browser may in turn execute on client devices 110 or 120. Application 132 may take various other forms as well.

Application server 130 may execute database 140, which may be an in-memory database that may offer faster database reads and writes as compared to databases that are not in-memory. Examples of such databases may include, but are not limited to: relational databases, hierarchical databases, distributed databases, in-memory databases, flat file databases, XML, databases, NoSQL databases, graph databases, and/or a combination thereof.

Database 140 may store data associated with one or more users of application 132. Such stored data may comprise information that may be used to authenticate users, such as usernames and passwords, user profile information, and/or application data. As an example, application 132 may comprise a financial application. Authentication information for the user, such as information for validating a user's username and password may be stored in database 140. Additionally or alternatively, application data related to the user, such as a user's financial account balances, recent transactions, credit score data, fraud monitoring data, etc., may be stored in database 140. In some examples, such user profile information may comprise color data that may be associated with conditions of the application, and/or importance levels that may be associated with those application conditions.

Application 132 may utilize such color data when performing the color-based notification techniques described herein. As described in greater detail below, some or all of such color data may be pre-defined, for instance according to a pre-defined color scheme. In some examples, some or all of the color data may be user-defined. While such preferences are described as being stored within database 140, it should be understood that such preferences may be stored locally, for example on client devices 110, 120, as well.

Various computing devices are described as performing functions described in the context of operating environment 100. However, it should be noted that any computing device or combination of computing devices in the operating environment 100 may perform any of the processes and/or store any data as described herein The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in data transfers to protect the integrity of the data such as, but not limited to, Secure File Transfer Protocol (SFTP), and/or Pretty Good Privacy (PGP) encryption. In many embodiments, one or more web services may be implemented within the various computing devices of operating environment 100. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
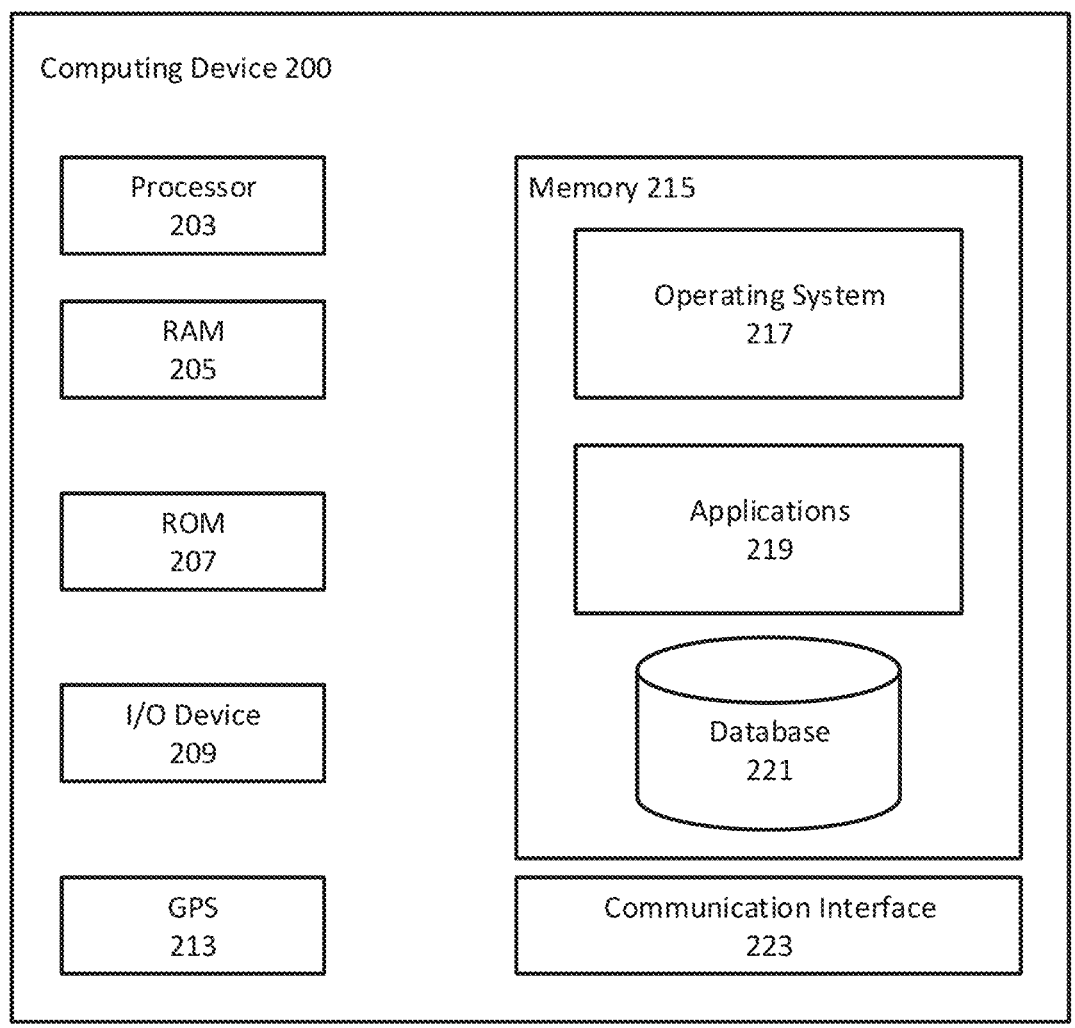
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 223, and/or memory 215. A data bus may interconnect processor(s) 203, RAM 205, ROM 207, memory 215, I/O device 209, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, applications 219, and/or an associated internal database 221. The various hardware memory units in memory 215 may include volatile and/or nonvolatile, removable and/or non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 223 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP/S, TLS, and the like, and of various wireless communication technologies such as GSM, CDMA, WiFi, LTE, and/or 5G is presumed, and the various computing devices described herein may be configured to communicate using any of these network protocols or technologies.

Processor 203 may include a single central processing unit (CPU), which may be a single-core or multi-core processor, or may include multiple CPUs, which may have a single core or multiple cores. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Example Notification UIs

As described above, a GUI of an application, such as application 132, may comprise multiple UI elements. An application configured in accordance with this disclosure may change (e.g., modify) the appearance, such as one or more colors of one or more such UI elements in order to output a notification of an action to the user. Such an application may modify the appearance of UI elements based on factors, such as an importance of an action that a user is to take with respect to the application, and/or an importance of the requested action. Example UIs of such an application are illustrated in FIGS. 3A, 3B, and 3C, and in FIGS. 4A and 4B.

Figure 3A:
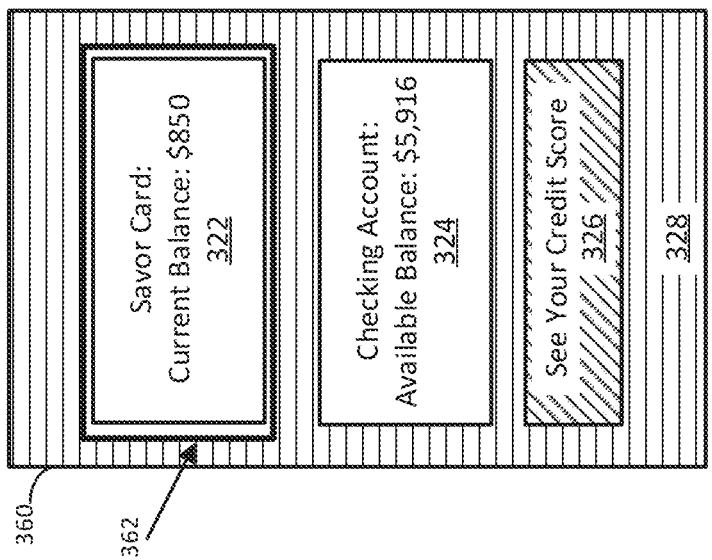
FIG. 3A shows an example of an application GUI in accordance with one or more aspects described herein.

Turning now to FIG. 3A, an example UI 320 of an application, such as application 132, is illustrated. Application 132 may take various forms, but is illustrated as a financial application in FIGS. 3A, 3B, and 3C. In the examples of FIGS. 3A-3C, UI 320 comprises UI elements 322, 324, 326, and 328, but may take various other forms as well. In FIGS. 3A-3C, Elements 322, 324, and 326 are foreground user interface elements. A user may select any of user input elements 322, 324, or 326 to cause application 132 to perform an action based on the user input associated with that UI element. Element 328 is a background UI element, which may or may not be user-selectable.

Figure 3B:
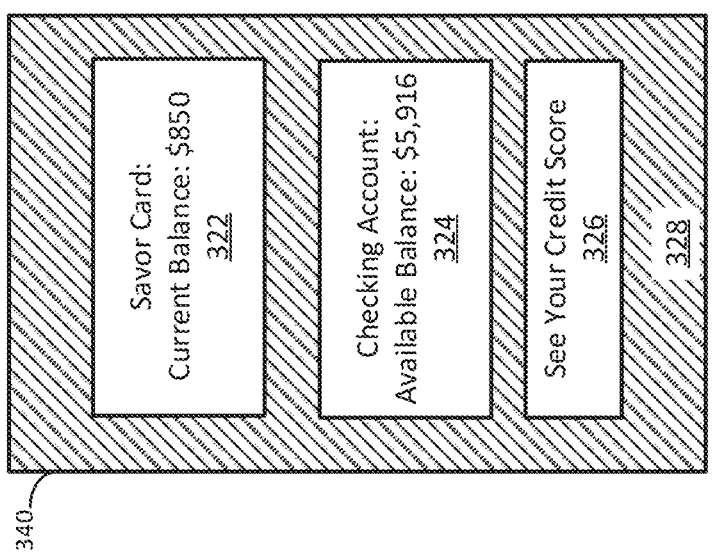
FIG. 3B shows an example of an application GUI in accordance with one or more aspects described herein.
Figure 3C:
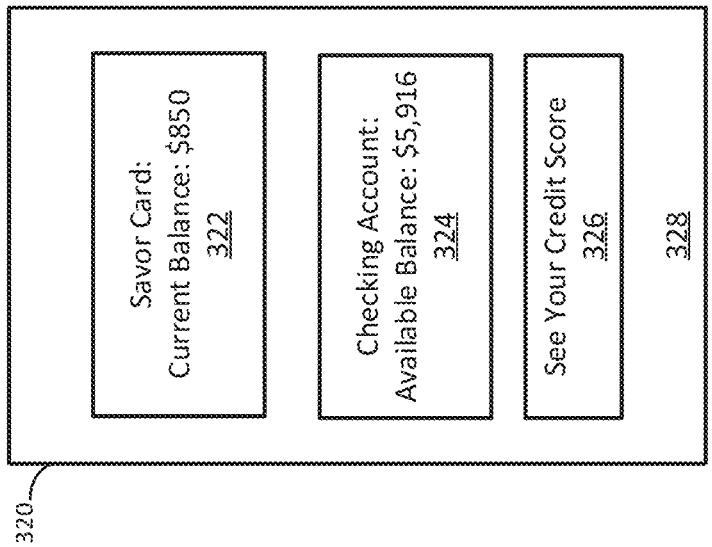
FIG. 3C shows an example of an application GUI in accordance with one or more aspects described herein.

In the examples of FIGS. 3A, 3B, and 3C, user elements 322, 324, 326, and 328 are illustrated as having either a default color or a modified color. A UI element that would be output having its default color is indicated by an absence of an interior pattern fill within that UI element. A UI element that would be displayed with a modified color applied to it is indicated by hashing within that UI element.

In the example UIs 320, 340, and 360 shown in FIGS. 3A, 3B, and 3C, respectively, UI element 322 is depicted using the illustrative example of a credit card called a "Savor Card," which has a balance of $850. A user may select element 322 to cause application 132 to output a different display screen that may show additional details related to the Savor credit card. Such additional details may include data such as credit card statements, transactions, bills, etc. Element 324 is associated with a user's checking account, and has text indicating that the checking account has a balance of $5,916. A user may select UI element 324 to navigate to a different screen that may display additional details associated with the user's checking account, such as recent deposits, debits, etc. UI element 326 includes the text "See Your Credit Score." A user may select UI element 326 to cause output of a different display screen that may display the user's credit score, and/or other credit score-related information.

In UI 320 of FIG. 3A, UI elements 322, 324, 326, and 328 are shown as having their default colors. Such a default background color may be pre-set by the application or may be user-defined. As an example, by default, background element 328 may be grey, the default color of element 322, 324, and 326, may be brown, blue, and white, respectively. While elements 322, 324, 326, and 328 are described as having these default colors for the purpose of example, it should be understood that these UI elements may have other default colors as well. Also, while elements 322, 324, 326, and 328 are described as being a single color for the purpose of example, it should be understood that some or all of these elements may be shown with multiple colors. For example, a background of element 322 may be a brown gradient for a background, while the text "Current balance: $850" displayed atop the background may be shown with a different color (e.g., white). In some examples, some or all of elements 322, 324, 326, and 328 may comprise images, which may have multiple different colors. Such UI elements may take various other forms as well.

Application 132 may authenticate a user with application 132 based on authentication information, such as a username and password, etc. supplied by the user. If the user provides proper authentication information, application 132 may successfully authenticate the user, log the user into application 132, and display UI 320. Otherwise, if application 132 determines that the user has not been successfully authenticated, application 132 may deny the user access to UI 320.

Based on the user being authenticated, application 132 may identify account data that is associated with the user. Application 132 may also determine whether any conditions are associated with the user's account. Application 132 may further determine an importance level associated with each such condition. If application 132 determines that a condition is associated with the user's account, application 132 may further determine an action associated with that condition, and a UI element corresponding to the action. Application 132 may determine an importance of the action and/or condition. Based on the determined importance, application 132 may modify the appearance of the UI element, such as the color of the identified UI element, that corresponds to the action. The function of changing UI element appearances and colors based on an associated action and/or condition is described in greater detail below with respect to FIGS. 3B and 3C.

If application 132 determines that an action is not associated with a given UI element, or if the determined action is determined not to have a sufficiently high enough level of importance, application 132 may cause the UI element to retain its default color. Turning now to the example of UI 320 of FIG. 3A, UI elements 322, 324, 326, and 328 may be shown with their default colors. UI elements 322, 324, 326, and 328 may be illustrated having their default colors, for instance, if application 132 has determined that no action for the user to take is associated with any of UI elements 322, 324, 326, or 328, or if an action associated with any of elements 322, 324, 326, and/or 328 has an importance that is below a minimum importance level. Thus, in the example shown in FIG. 3A, all the elements of UI 320 may have their default appearance. Based on all the elements of UI 320 having their default colorations, a user may be able to quickly determine that there is no outstanding action for the user to perform with respect to application 132 that has a priority above some minimum priority level.

Turning now to FIG. 3B, a UI 340 is shown in which the color of a UI element, background element 328, has been changed to a modified color that is different than its default color. The default color background UI element 328 may be gray. In UI 340, application 132 may have changed the color of background element from its default gray color to a red color which may correspond to a first modified color. In the examples of FIGS. 3B and 3C, the first modified color (red) is indicated by diagonal hashing within an element, background element 328 in the example of UI 340.

Each modified color, such as the modified color of UI element 328, may be associated with an importance level that the user is to perform with respect to application 132. In the example shown in UI 340 of FIG. 3B, a red color, such as the red color applied to background element 328, may be associated with a high importance level. Changing the color of background element 328 to the red color, such as may be associated with the high importance level, may indicate to the user that there is an action with high importance for the user to take with respect to application 132.

In the context of such a financial application, such conditions having high importance may include, but may not be limited to: fraudulent activity on a user's account, an overdue bill payment, an issue with a user's credit score, as some non-limiting examples. Such high importance conditions may take other forms as well.

In the example shown in UI 340 of FIG. 3B, application 132 may have determined a condition in the form of a user having an unpaid bill, which may be associated with a high importance level. Based on application 132 determining that a condition having a high importance level is associated with the user or the user's account (the user having an unpaid bill), application 132 may determine an action for the user to perform with respect to the application. Such actions may take various forms.

As one example, such an action may involve the user addressing the condition. In the case of the user's overdue bill payment, addressing the condition may involve the user viewing the overdue bill, and/or paying the bill. Such actions associated with a condition may take various other forms as well. As another example, if a condition involves fraudulent activity being detected on a user's account, the user action may involve the user examining suspected fraudulent account transactions, and/or indicating whether those transactions are fraudulent. Alternatively, the action associated with the determined fraudulent activity may involve the user contacting a customer support representative to discuss the suspected fraudulent activity. In yet another example, the condition may involve a change in the user's credit score. Application 132 may determine that an action associated with this condition has high importance if, for example, there is a large decrease in the user's credit score. Such an action having high importance may involve the user viewing changes to, or the status of, his or her credit score. Such actions may take various other forms as well.

In some examples, application 132 may indicate multiple actions that the user is to perform. Each action may be indicated by a color that has been applied to a corresponding respective user interface element. Turning now to FIG. 3C, a UI 360 is illustrated, which shows multiple UI elements that each have a corresponding color applied to them. The corresponding color that is applied to each UI element may be associated with an importance level, which may indicate the importance of an action for the user to perform.

In UI 360, element 322 is surrounded (e.g., enclosed) by a colored outline 362. Additionally, the color of element 326 has been changed to the first color, and background 328 has been changed to a second color that is different from the first color. As described above with respect to FIG. 3B, the first color may be indicated by diagonal hashing, and may indicate an action having a high importance level that the user is to perform.

Application 132 may apply the first color to UI element 326 based on determining that UI element 326 is associated with the action that the user is to perform. For example, application 132 may determine that a condition exists with respect to the user's credit score. Based on the determined credit score condition, application 132 may determine that the user should select UI element 326 to view user's credit score. Because UI element 326 is associated with the requested user action of viewing the user's credit score, application 132 may apply the first color to UI element 326. The first color may indicate that it is of high importance for the user to view his or her credit score by selecting element 326.

Background UI element 328 is shown in UI 360 as having a second color, which is indicated with horizontal line hashing. The second color, which is shown with respect to background 328 in FIG. 3C, may indicate that there is an action having an importance other than a high importance, such as an action having a medium importance level. As an example, a condition having such a medium importance level may be a user having been sent a new credit or debit card that the user has yet to activate. An action corresponding to such a medium importance level may involve the user activating the credit card or the user acknowledging a message indicating that the card has been sent to the user.

Example conditions that may be associated with medium importance levels may take various other forms as well. For instance, such conditions that may be associated with a medium importance level may include: the user nearing his/her credit limit, having received a new credit card that has not yet been activated, whether or not the user is reaching a financial goal (e.g., desired savings amount, credit score, etc.), the user having a bill that is due, and/or a change in the user's credit score, as some non-limiting examples. Such conditions having a medium importance level may take various other forms as well.

In addition to changing the color of UI elements 326 and 328, UI element 322 is shown with a surrounding outline 362. According to some examples, the outline 362 surrounding element 322 may be shown with a color. The color of outline 362 may be the same as, or different from the first and second colors shown with respect to UI elements 326 and 328, respectively. Outline 362 may have the same color as UI element 326 or 328 if an action that the user is to take has the same level of importance level as the action to be taken with respect to UI element 326 or 328.

Outline 362 may further indicate that a user is to take an action with respect to element 322. As an example, application 132 may determine a condition that is associated with the user's Savor credit card, such as a new credit card transaction. Such a condition may have a low importance. Based on the new credit card transaction, application 132 may determine an application for the user to take, such as viewing the new transaction. Viewing the new card transaction may have a low importance. Actions having a low importance may be indicated with a third color, such as a green color, as one possibility. Application 132 may further identify a UI element, in this case UI element 322, that the user may select to perform the action of viewing the credit card transaction. Based on the identified UI element 322, application 132 may generate and output outline 362 for display with the third color. Based on the low importance associated with the action of the user viewing the new credit card transaction, the color of outline 362 may be green.

In some examples, Application 132 may scale the size of a UI element that is surrounded or enclosed by such an outline. The UI element may be scaled based on the thickness of the outline. For example, if outline 362 is ten pixels wide in total (e.g., has a thickness of five pixels on each side), application 132 may reduce the size of (e.g., scale) the outlined element, such as element 326, by five pixels on each side to compensate for the size of the outline.

The non-default colors applied to UI elements may be applied in various manners in order to draw the user's attention to those UI elements. For example, the first and second colors applied to elements 328 and 326 may be shown when UIs 340 and 360 are first displayed to the user. However, immediately displaying the altered colors of such UI elements to the user when a UI is first displayed may not readily convey to the user that the colors of such UI elements have changed from their default colors. To draw a user's attention to UI elements having changed colors, application 132 may calculate or determine a time delay, and wait for the delay to elapse before changing the color of one or more UI elements (e.g., elements 326 and 328) to a non-default color.

For example, after initially displaying UI 340 of FIG. 3B, application 132 may calculate a delay (e.g., of 0.5 seconds) and wait for the delay to elapse. After the delay has elapsed, application 132 may change the color of background element 328 from its default color to the first color. In some examples, application 132 may gradually change the color of a UI element from its default color to a non-default color. For instance, background element 328 may be gradually changed from its default gray color to the first color (red) over the course of a time period, such as a number of seconds.

In the above examples described with respect to FIGS. 3B, and 3C, the colors of various UI elements are described as changing from a default color to a different color. While the above examples describe changing a color of a UI element to a single different color, it should be further understood that a color of UI element may be partially changed to a different color. For example, if element 326 is changed to the first color (e.g., red) as shown in UI 360 of FIG. 3C, the red color may be blended in with the default color of element 326, rather than completely changing the color of element 326 to red.

Additionally or alternatively, if a color of at least one UI element is changed from its default color to a different color, UI elements retaining their default color may be de-emphasized. For example, in FIG. 3C, UI element 324 is shown as having its default color, while elements 326 and 328 have different colors, and element 322 is surrounded by a color outline 362. Because UI element 324 retains its default color and is not associated with an action for the user to perform, application 132 may de-emphasize UI element 324. De-emphasizing such a UI element may involve fading out the UI element, such as making the UI element more transparent or translucent, as some examples. UI elements may be de-emphasized in various other manners as well.

Application 132 may also monitor each action, indicated by a modified UI element color, that the user is to perform with respect to application 132. For example, application 132 may monitor the user's actions to determine whether the user has completed a monitored action, such as checking a credit score, or viewing an overdue bill. If application 132 determines that the user has completed the action, application 132 may remove the color from the UI element associated with that action. For instance, in the example of FIG. 3C, application 132 may monitor the user's actions to determine whether the user has viewed the overdue bill. Based on determining that the user has viewed the overdue bill, application 132 may remove the second color from background element 328. Removing the second color from background element 328 may return background element 328 back to its default color. In some cases, the color of the UI element may revert to its default color after a time delay. In some examples, the color of a UI element may gradually change from a modified color to its default color rather than immediately changing back to the default color.

Application 132 may also monitor a user's actions to determine whether a user has failed to complete an indicated action. If a user has not completed an indicated action, application 132 may change the color or appearance of a UI element associated with the action that the user has yet to complete. For example, referring back to UI 360 of FIG. 3C, a user may be presented with UI element 326, which may be colored red to indicate that it is of high importance for the user to view his/her credit score. However, the user may choose to avoid looking at the credit score. In such a scenario where a user does not perform the indicated action, application 132 may change the appearance (e.g., color) of the user interface element to indicate a heightened importance level of performing the action. For instance, if the user has not checked his/her credit score, application 132 may make the red color more intense (e.g., a deeper shade of red) to further emphasize the importance of checking the user's credit score. Emphasizing a UI element by modifying its appearance may take various other forms, and may be based on various other conditions as well.

Application 132 may determine each color that is associated with each importance level in various manners. For instance, the colors shown FIGS. 3A, 3B, and 3C may automatically be determined by application 132 based on a preset color scheme, and/or or may be at least partially determined based on user input. Turning now to FIG. 4A, an example UI 420 for selecting colors corresponding to high and medium importance levels is shown.

UI 420 comprises first UI element 422, first color picker 424, second UI element 426, and second color picker 428. First UI element 422 may generally indicate that a corresponding user interface element, such as first color picker 424 may be used to select a color that is associated with actions having a high level of importance. Accordingly, first UI element 422 may include text, such as "high importance."

First color picker 424 may be configured to receive one or more user inputs. Based on the received user inputs, application 132 may assign the first color that is associated with the high importance level. As an example, a user may select first color picker 424, which may cause application 132 to display a palette of colors from which the user may select a particular color. For instance, the color palette may display commonly-used colors, and/or may allow a user to select a color based on an associated RGB or hexadecimal value that the user may specify. After the user selects a color, first color picker 424 may display the first color. In the example of FIG. 4A, a user has selected a red color (indicated by diagonal hashing) to be the color associated with the high importance level. The first color is shown in first color picker 424.

Second user element 426 may be associated with second color picker 428, and may indicate that a color associated with a medium importance level may be selected by using second color picker 428. In the example shown in FIG. 4A, the user may have selected a yellow color (represented by horizontal hashing), which may be used to indicate an action associated with a medium importance level. After being selected, the yellow color may be displayed in second color picker 428.

UI 420 of FIG. 4A illustrates user interface elements that may be used to select two different colors that may be associated with two different importance levels. However, it should be understood that such a UI may include more or fewer user interface elements, which may allow for selections of more or fewer colors and associated importance levels. Additionally, it should be understood that UI 420 is just one example UI and that such color selection UIs may have various other appearances and forms as well.

In some instances, application 132 may be configured to colors associated with respective importance levels based on one or more previously-chosen color selections. For instance, a user may select red as a first color as being associated with a first importance level. Based on the selected red color, application 132 may determine a complementary second color that is associated with the medium importance level. In some configurations, the user may be able to override such an application-determined complementary color. Alternatively, application 132 may prevent a user from overriding such a complementary color, for example if the user is attempting to select a secondary color that is too similar color-wise to the first color, or that will blend-in with the first color. In the above example, application 132 may prevent the user from selecting both red and pink as the first and second colors because they may blend-in with each other and thus may be hard for the user to distinguish from each other.

Application 132 may also be configured to change colors of UI elements based on a user's color selection for a given importance level. For example, if a user selects a light red color as being associated with a high importance level, and the light red color is applied to the background of a user interface element having text, such as UI element 322 (shown in FIGS. 3A, 3B, and 3C) light-colored text may blend-in with the light red colored background of element 322. If the text and background of a UI elements blend together, a user may not be able to read the text. To avoid such blending issues, application 132 may change the text of a UI element to a color that is more visible atop the light red background, such as black, for example.

Additionally or alternatively, application 132 may consider the color of any containing UI elements when suggesting or determining a color that is associated with an action. For example, if a background element would be displayed as gray, and a foreground element displayed atop the background would also be displayed as gray, application 132 may adjust the color of the foreground UI element such that it does not blend-in with the background element when the elements are displayed.

Once a color scheme has been defined that indicates one or more colors are associated with one or more color levels, the user may be presented with a preview UI, such as the preview UI 440 shown in FIG. 4B. UI 440 may show the colors associated with each importance level on one or more UI elements. In the example of FIG. 4B, UI element 324 is shown with the second color that is associated with the medium importance level, and UI element 328 is shown with the first color that is associated with a high importance level. By presenting a user with an example UI for the user to view, the user may be able to quickly determine whether the chosen color scheme is acceptable to the user.

The colors shown in UI 440 of FIG. 4B may correspond to the colors selected in FIG. 4A. That is, a red color may correspond to an action having high importance, and may be represented in FIG. 4B with a diagonal hashing, and a yellow color may correspond to an action having medium importance. Such a yellow color may be represented with horizontal hashing. Thus, in UI 440, background UI element 328 may be displayed with a red color, and UI element 324 may be displayed with a yellow color.

The preview generated by UI 440 may allow a user to quickly determine whether the currently-selected color scheme is acceptable to the user. According to some configurations, if such a color scheme is not acceptable, the user may return to UI 420 of FIG. 4A from which the user may select one or more different colors to assign to the importance levels. While UIs 420 and 440 of FIGS. 4A and 4B are shown as separate UIs, UIs 420 and 440 may be combined in some configurations. For example, UI 420 of FIG. 4A may be displayed concurrently with UI elements 322, 324, 326, 328, etc., of UI 440. Based on a user's selection of a color for a given importance level, the colors of UI 440 may be adjusted to reflect the newly-chosen colors.

Figure 5:
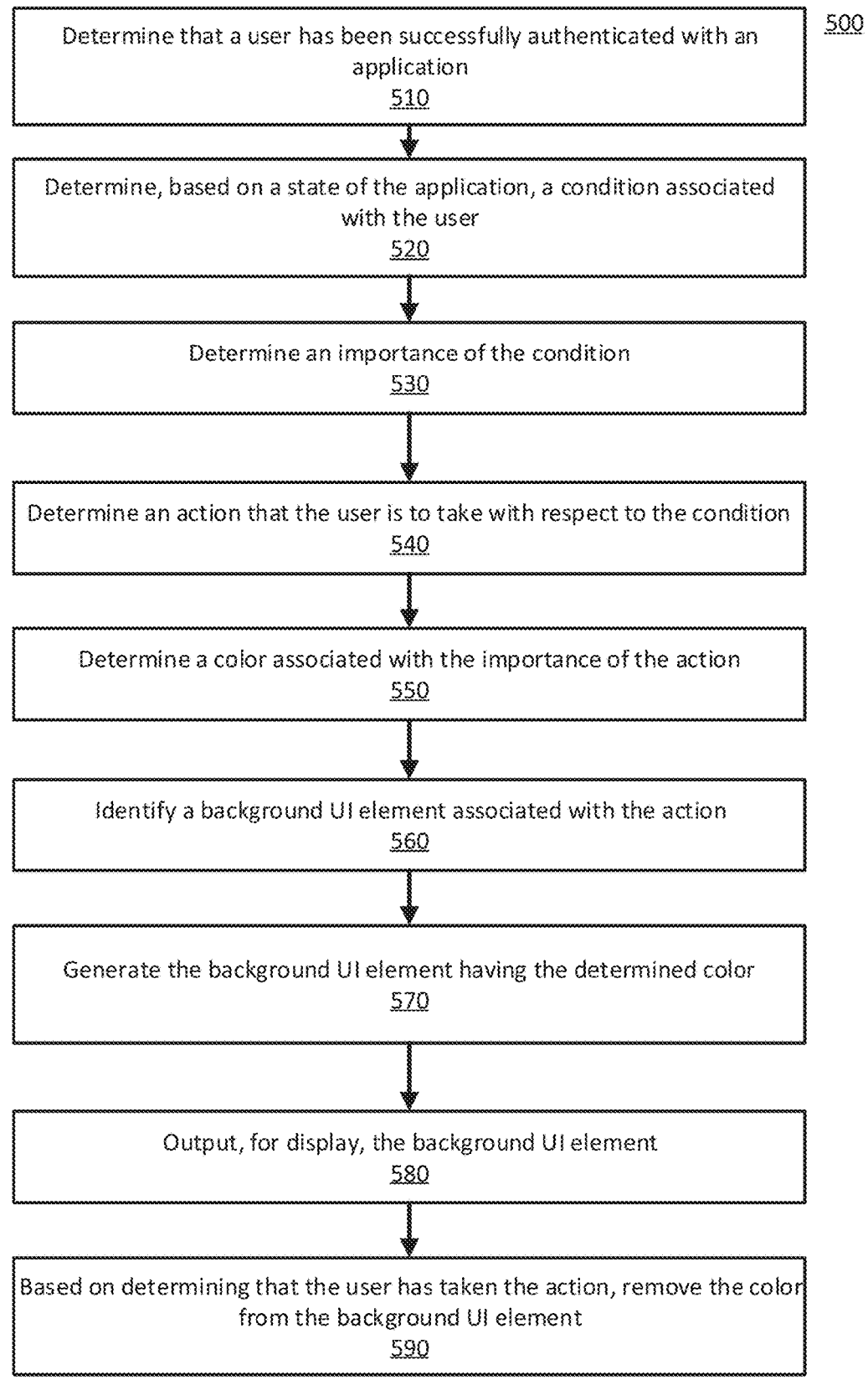
FIG. 5 shows a flow chart of a process for modifying an appearance of a UI element based on an importance of an action and/or condition in accordance with one or more aspects described herein.

FIG. 5 shows an example flow chart of such a process 500 for modifying an appearance of a UI element based on an importance of an action and/or condition. Some or all of the steps of process 500 may be performed using one or more computing devices as described herein. In a variety of embodiments, some or all of the steps described below may be combined and/or divided into sub-steps as appropriate.

At step 510, an application (e.g., application 132) may determine that a user has been successfully authenticated using the application. Such a successful authentication may be determined based on a user's provided credentials, which may be used to verify the user's identify. In some examples, such credentials may take the form of a username, password, multi-factor authentication, cryptographic key, etc.

At step 520, the application may be configured to determine, based on a state of the application, a condition associated with the user. Such a condition may take various forms. For example, if an application comprises a financial application, such a condition may be associated with a user's financial state. For instance, a condition may be associated with a user's credit score, account balance, bill payments, a newly-issued credit card, financial goal, upcoming payment, problem with a user's account, etc.

At step 530, the application may determine an importance of the condition. Such an importance may be determined in various manners. As one example, an importance may be determined based on the consequences of the user not taking an action associated with the condition. As another example, the importance may be determined based on a time period with which the user should take an associated action. In still other examples, the importance may be determined based on an importance level of an associated condition. In some examples, application 132 may define an importance level associated with a condition based on the user specifying such an importance level. For example, a user may specify that an overdue bill is associated with a medium, or low importance level. In some instances, a plurality of these factors may be used, such as in a weighted algorithm. Importance levels may be categorized as high, medium, low, as just some examples. Importance levels may take various other forms as well.

At step 540, the application (e.g., application 132 executing on application server 130 and/or client device 110 or 120) may determine an action that the user is to take with respect to the condition. As some examples, such an action may comprise the user viewing content that is associated with the condition, such as viewing a message that a bill is overdue or that a user's credit score has changed. Such an action may involve the user responding to a message output by application 132. For example, the user may be presented with a message indicating suspected fraudulent credit card charges. The action may be the user providing an indication of whether or not the user believes the suspected charges to be fraudulent.

At step 550, the application may determine a color associated with the importance of the action. Such a color may be determined in various manners. As one example, the application may determine the color based on a predefined color scheme. As another example, the color may be specified based on a user's selection, as may be described with respect to FIGS. 4A and 4B. The color may be specified based on some combination of a predefined color scheme and user-defined color as well.

At step 560, the application may identify a background UI element that is associated with the action. The identification of the background element may be performed in various manners. As one example, the application may identify the background layer that is part of a display screen related to an action that the user is to perform. For example, if the user has an overdue bill that the user may view from a bill pay screen, the application may identify the background element of this bill pay screen. The application may identify the background UI element in various other manners as well.

At step 570, the application (e.g., application 132 executing on application server 130 and/or client device 110 or 120) may generate the background UI element. The generation of the background UI element may take various forms. For example, if the application is a web-based application, application server 130 may generate markup and/or styling information that, when rendered by a web browser, may cause display of the background UI element. If the application is a mobile application or a desktop application, the application may make an application programming interface (API) call, which may cause the identified background UI element to have the determined color. Generating the background UI element may take various other forms as well.

At step 580, the application may output, for display, the background UI element. If the application is a web application, a web browser may cause display of the background UI element by rendering the background UI element based on markup and/or styling information provided by a server (e.g., application server 130). In the case of a mobile or desktop application, the application may cause a computing device that is executing the application to render and output the background UI element, which has previously been designated as having the determined color. The background UI element may be output, for instance, to a display screen, such as a monitor, touch screen, etc.

At step 590, and based on determining that the user has taken the action, the application may remove the color from the background UI element. As described above, if there is a condition that has been associated with a user, the application may be configured to monitor actions that the user takes with respect to the application to determine whether the user has completed the action. For example, the application may monitor for the user completing the action, which may be the user viewing an overdue bill, as an example. The application may monitor for completion of the action by monitoring user inputs, as just one example. Based on the application having determined that the user has viewed the bill, the application may remove the previously-determined color that is associated with the importance level from the background color. Removing the color from the background UI element may return the background UI element back to its default color.

Figure 6:
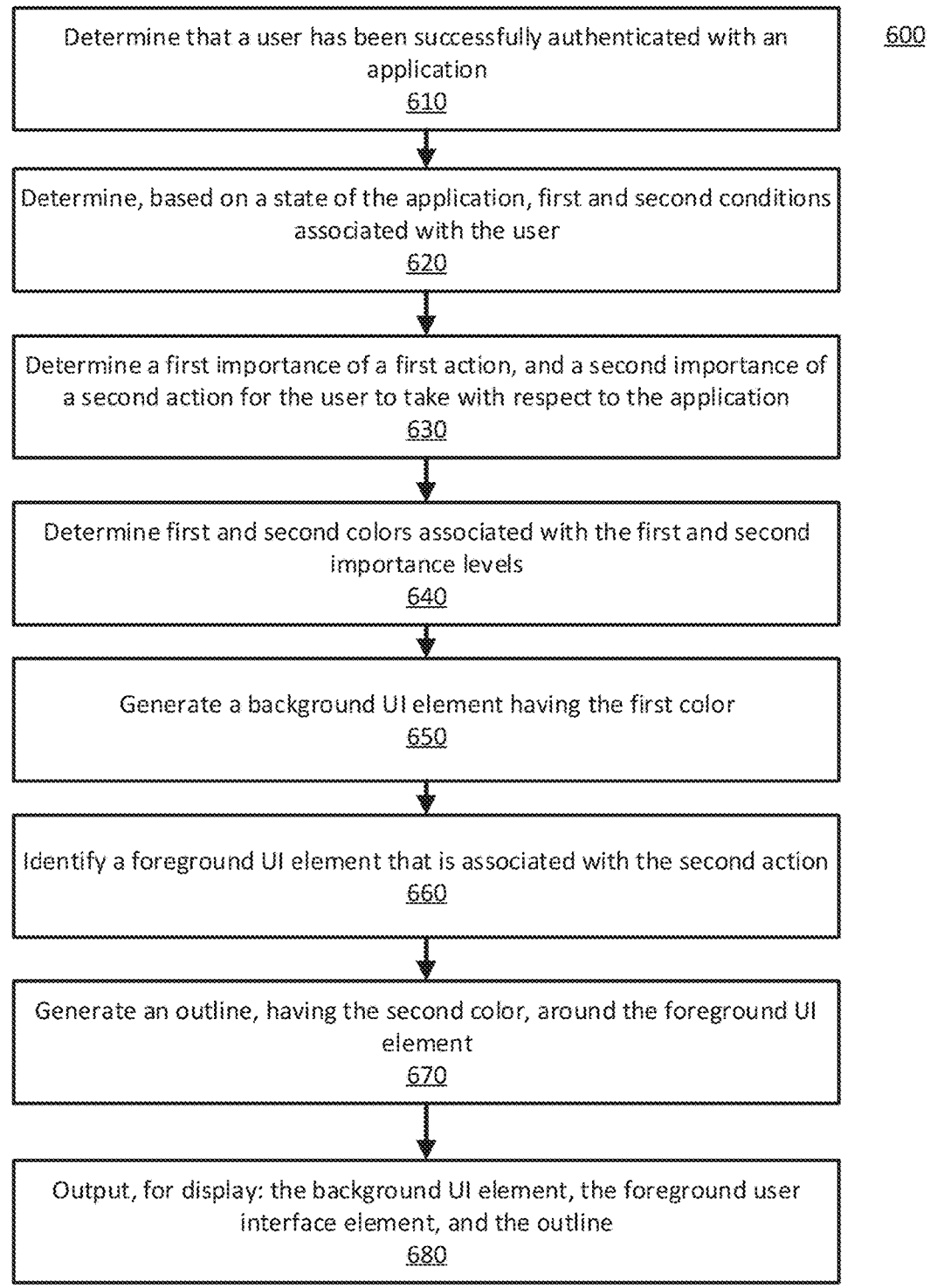
FIG. 6 shows a flow chart of a process for modifying an appearance of a UI element based on an importance of an action and/or condition in accordance with one or more aspects of the disclosure.

As noted above, application 132 may modify the appearance of multiple UI elements based on conditions associated with a user of an application, which is described in process 600 of FIG. 6. Process 600 may begin at step 610. At step 610, an application (e.g., application 132 executing on application server 130 and/or client devices 110, 120) may determine that a user has been successfully authenticated using the application. Such a successful authentication may be determined based on a user providing credentials, which may be used to verify the user's identify. In some examples, such credentials may take the form of a username, password, multi-factor authentication, cryptographic key, etc.

At step 620, the application may be configured to determine, based on a state of the application, first and second conditions that are associated with the user. Such conditions may take various forms. For example, in the context of a financial application, the first condition may be the user having an overdue bill, and the second condition may be a change in the user's credit score.

At step 630, the application may determine a first importance of a first action, and a second importance of a second action, for the user to take with respect to the application. The first importance and second importance may be determined in various manners. As one example, the first and second importance may be determined based on the consequences of the user not taking an action associated with the first or second condition. As another example, the first and second importance may be determined based on a time period with which the user should take an action associated with the first or second condition. In some examples, the application may define first and second importance levels based on a user specifying such importance levels. For example, a user may specify that an overdue bill is associated with a medium importance level and that a change in the user's credit score is associated with a high importance level. Such importance levels may be determined in various other manners as well.

At step 640, the application may determine a first color that is associated with the importance of the first action, and a second color associated with the importance of the second action. Such colors may be determined in various manners. As one example, the application may assign the first and second colors based on a predefined color scheme. For instance, the first color may be assigned a red color based on the first color being associated with a high importance level. And, the second color may be assigned a yellow color based on the second color being associated with a medium importance level. As another example, the first and second colors may be specified, for example based on user input selections. In such an example, a user may assign blue to the first color, which may be associated with the high importance level, and may assign a green color to the second color that is associated with the second importance level. The color may be specified based on some combination of a predefined color scheme and user-defined color as well. For instance, if the user assigns red to the first color, the application may automatically assign yellow to the second color based on yellow contrasting with red.

At step 650, the application may generate a background UI element, associated with the first action, having the first color. The generation of the background UI element may take various forms. For example, if the application is a web-based application, application server 130 may generate markup and/or styling information that, when rendered by a web browser, may cause display of the background UI, which when displayed is shown with the first color. If the application is a mobile application or a desktop application, the application may call an application programming interface (API), which may cause the identified background UI element to have the first color when it is displayed by a computing device.

At step 660, the application may identify a foreground UI element that is associated with the second action. The identification of the foreground element may be performed in various manners. As one example, the application may identify the foreground UI element that is part of a display screen related to an action that the user is to perform. For example, if the user has an overdue bill that the user may view from a bill pay screen, the application may identify a foreground UI element that, if selected by a user, may cause display of this bill pay screen, or may take the user to the unpaid bill. The application may identify the foreground UI element in various other manners as well.

At step 670, the application may generate an outline UI element, having the second color, around (e.g., enclosing or surrounding) the identified foreground UI element. The generation of the outline UI element may take various forms. For example, if the application is a web-based application, application server 130 may generate markup and/or styling information that, when rendered by a web browser, may cause display of the outline element, which when displayed is shown with the second color. If the application is a mobile application or a desktop application, the application may call an application programming interface (API), which may cause the identified foreground UI element to be surrounded by an outline having the second color when the outline is displayed by a computing device. In some circumstances, the application may scale the size of the foreground UI element based on the size of the outline. For example, if the outline is ten pixels wide and ten pixels tall, the application may scale (reduce) the size of the foreground UI element by ten pixels in the vertical and horizontal dimensions.

At step 680, the application may output, for display, the background UI element, foreground, UI element, and the outline. Output of such UI elements may take various forms. For example, if the application is a web application, a web browser may cause output of the background UI element, foreground UI element, and outline UI element by rendering these UI elements based on markup and/or styling information provided by a server (e.g., application server 130). In a case where the application is a mobile or desktop application, the application may cause a computing device that is executing the application to render and output the background, foreground, outline UI elements.

Figure 7:
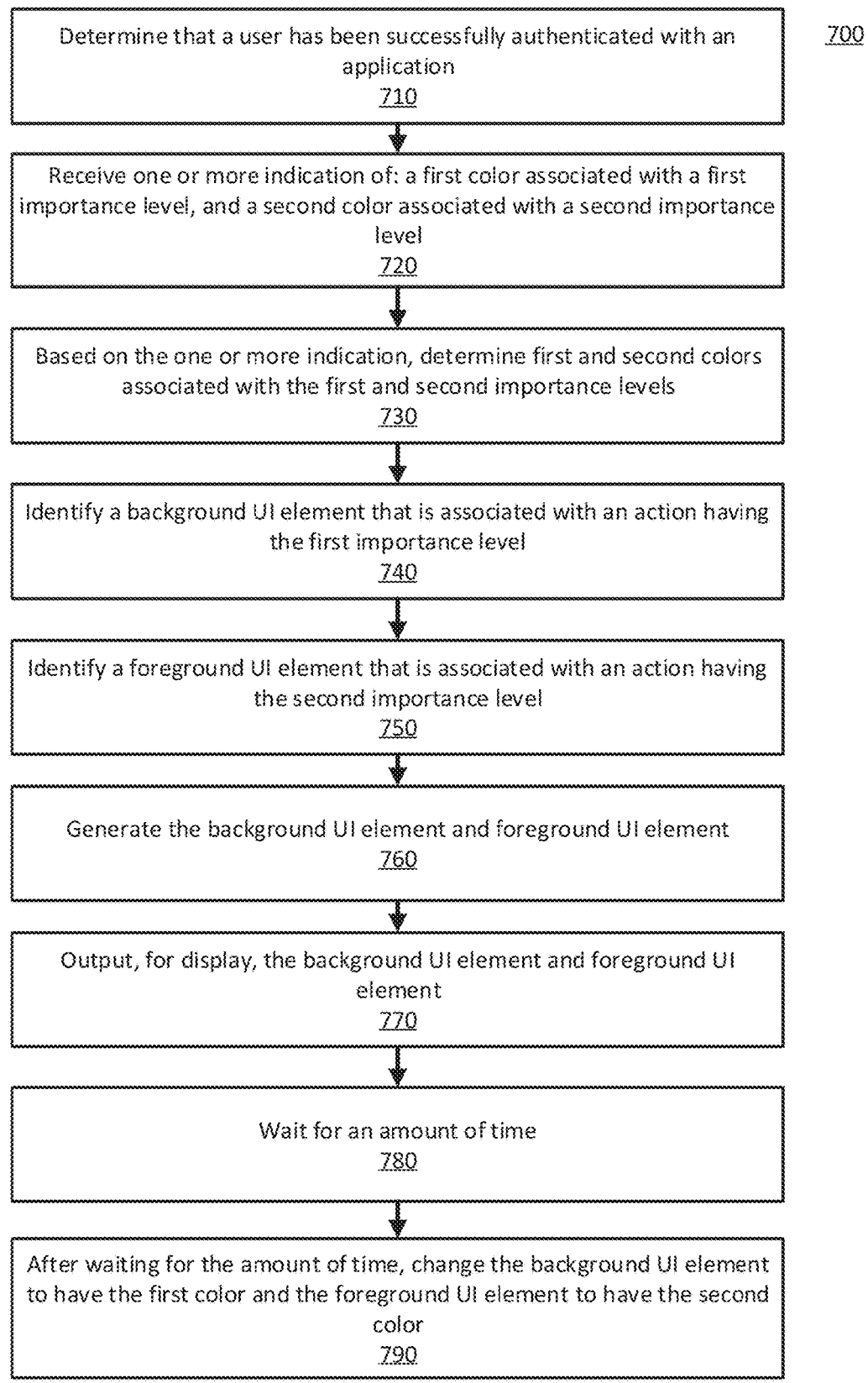
FIG. 7 shows a flow chart of a process for modifying an appearance of a UI element based on an importance of an action and/or condition in accordance with one or more aspects of the disclosure.

As discussed above, in some instances, a computing device may wait for an amount of time (e.g., a delay time) before changing the color of a UI element from its default color to a non-default color, as shown in process 700 of FIG. 7. Process 700 may begin at step 710. At step 710, an application (e.g., application 132 executing on application server 130 and/or client devices 110, 120) may determine that a user has been successfully authenticated using the application. Such a successful authentication may be determined based on a user providing credentials, which may be used to verify the user's identify. In some examples, such credentials may take the form of a username, password, multi-factor authentication, cryptographic key, etc.

At step 720, the application may receive one or more indication of: a first color associated with the importance of the first action, and a second color associated with the importance of the second action. The one or more indication may be received in various manners. As one example, the application may execute on a client device, and the one or more indication of color the first and second color may be received from a server, such as application server 130. In some examples, the server may store data associating the importance levels and colors. Configuring the server to store such color association data may allow the user's color data to persist across multiple different devices. For example, such associations between colors and importance levels may persist regardless of the user uses client device 110 or client device 120 to execute the application.

At step 730, the application may determine a first color associated with the importance of the first action and a second color associated with the importance of the second action. Application 130 may determine the first and second colors based on the received indications of the first and second colors. For example, the application may determine, based on the one or more indication, that the first color is red and is associated with a high importance level, and that the second color is yellow and is associated with a medium importance level.

At step 740, the application may identify a background UI element that is associated with the first action having the first importance level. The identification of the background element may be performed in various manners. As one example, the application may identify the background layer that is part of a display screen related to an action that the user is to perform. For example, if the user has an overdue bill that the user may view from a bill pay screen, the application may identify the background element of this bill pay screen. The application may identify the background UI element in various other manners as well.

At step 750, the application may identify a foreground UI element that is associated with a second action having the second importance level. The identification of the foreground element may be performed in various manners. As one example, the application may identify the foreground UI element that is part of a display screen related to an action that the user is to perform. For example, if the user has an overdue bill that the user may view from a bill pay screen, the application may identify a foreground UI element that, if selected by a user, may cause display of this bill pay screen, or may take the user to the unpaid bill. The application may identify the foreground UI element in various other manners as well.

At step 760, the application may generate the background UI element and the foreground UI element. The generation of the background UI element and the foreground UI element may take various forms. For example, if the application is a web-based application, application server 130 may generate markup and/or styling information that, when rendered by a web browser, may cause display of the background UI and the foreground UI element, which may be shown with the first color and the second color. If the application is a mobile application or a desktop application, the application may call an application programming interface (API), which may cause the identified background UI element to have the first color when it is displayed by a computing device and the identified foreground UI element to have the second color when it is displayed by a computing device.

At step 770, the application may output, for display, the background UI element, and foreground UI elements. Output of such UI elements may take various forms. For example, if the application is a web application, a web browser may cause output of the background UI element and foreground UI element by rendering these UI elements based on markup and/or styling information provided by a server (e.g., application server 130). In a case where the application is a mobile or desktop application, the application may cause a computing device that is executing the application to render and output the background and foreground UI elements.

At step 780, the application may wait for an amount of time. The amount of time may be an amount of time to wait before changing the appearance of one or more UI elements. In some examples, the wait time may be predefined by the application. In other examples, the wait time may be user-defined.

At step 790, after waiting the amount of time, the application may change the background UI element to have the first color and the foreground UI element to have the second color. In some examples, the application may set a timer having an expiration time equal to the wait time. The application may determine that it has waited the set amount of time based on the timer expiring. Based on waiting the designated amount of time, the application may change the appearance of a background UI to the first color. For example, if the timer has an expiration time of 0.8 seconds, the application may set a programmatic timer having an expiration time equal to 0.8 seconds, and wait for the timer to expire. Based on the timer expiring, the application may change the color of the background UI element to a first color, such as a red color, which may be associated with a high importance level, as an example. Based on the timer expiring, the application may also change the color of the foreground UI element to a second color, such as a yellow color, which may be associated with a medium importance level, as an example.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

What is claimed is:

1. A computer-implemented method comprising:
   determining, using an application, that a user has been successfully authenticated with the application;
   determining, at a first time, a first action that the user is to take with respect to a first condition associated with the user, wherein the first action is to be taken with respect to the application;
   determining a second action that the user is to take with respect to a second condition associated with the user, wherein the second action is to be taken with respect to the application;
   determining:
      a first modified color associated with an importance of the first condition; and
      a second modified color associated with an importance of the second condition;
   outputting, at a second time after the first time, and for display via the application:
      a non-selectable background user interface element with a first default color, wherein the non-selectable background user interface element is associated with the first action;
      a first selectable foreground user interface element with a second default color, wherein the first selectable foreground user interface element is associated with the second action; and
      a second selectable foreground user interface element with a third default color;
   updating, after a first time delay period has elapsed since the second time, and for display via the application:
      the non-selectable background user interface element by gradually changing the non-selectable background user interface element from the first default color to the first modified color;
      the first selectable foreground user interface element by gradually changing the first selectable foreground user interface element from the second default color to the second modified color; and
      the second selectable foreground user interface element, based on a determination that no action above a predetermined importance level is associated with the second selectable foreground user interface element, by gradually increasing transparency of the second selectable foreground user interface element having the third default color; and
   based on a second time delay period and irrespective of whether the first action and the second action are performed, removing the first modified color from the non-selectable background user interface element.

2. The computer-implemented method of claim 1, wherein the removing the first modified color from the non-selectable background user interface element comprises changing the first modified color of the non-selectable background user interface element to the first default color, the method further comprising:
   receiving one or more user inputs via the application, wherein the first modified color associated with the importance of the first condition is determined based on the one or more user inputs; and
   based on the one or more user inputs indicating the first modified color, outputting, for display, a preview of the non-selectable background user interface element, wherein the non-selectable background user interface element has the first modified color in the preview.

3. The computer-implemented method of claim 1, wherein the first selectable foreground user interface element is overlaid on top of the non-selectable background user interface element.

4. The computer-implemented method of claim 1, further comprising:
   receiving one or more user inputs that indicate a selection of a pre-defined color scheme for notifications of the application,
   wherein the pre-defined color scheme comprises the first modified color and the second modified color.

5. The computer-implemented method of claim 1, wherein the computer-implemented method further comprises:
   calculating a third time delay period, and
   wherein the updating the non-selectable background user interface element comprises:
      waiting, based on the third time delay period, before replacing the non-selectable background user interface element having the first default color with a different version of the non-selectable background user interface element having the first modified color.

6. The computer-implemented method of claim 1, wherein the importance of the second action is less than the importance of the first action.

7. The computer-implemented method of claim 1, further comprising:
   determining that the importance of the first condition has increased;
   based on the determination that the importance of the first condition has increased, determining that the second modified color is associated with the increased importance of the first condition; and
   changing the non-selectable background user interface element from the first modified color to the second modified color.

8. The computer-implemented method of claim 1, wherein the first condition comprises one or more of:
   a late payment;
   an upcoming payment;
   a financial goal;
   a credit score change; or
   a problem with an account.

9. A computing device comprising:
   one or more processors; and
   memory storing instructions that, when executed by the one or more processors, cause the computing device to:
      determine, using an application, that a user has been successfully authenticated with the application;
      determine, based on a state of the application:
         a first condition that is associated with the user; and
         a second condition that is associated with the user;
      determine, at a first time:
         an importance of a first action for the user to take in the application with respect to the first condition; and an importance of a second action for the user to take in the application with respect to the second condition; and output, at a second time after the first time, and for display via the application:
- a non-selectable background user interface element that has a first default color and is associated with the first action;
- a first selectable foreground user interface element that has a second default color and is associated with the second action; and
- a second selectable foreground user interface element that has a third default color;

update, after a time delay period has elapsed since the second time, and for display via the application:
- the non-selectable background user interface element by gradually changing the non-selectable background user interface element from the first default color to a first modified color;
- the first selectable foreground user interface element by gradually changing the first selectable foreground user interface element from the second default color to a second modified color; and
- the second selectable foreground user interface element, based on a determination that no action above a predetermined importance level is associated with the second selectable foreground user interface element, by gradually increasing transparency of the second selectable foreground user interface element having the third default color; and output, based on a determination that the importance of the first action and the importance of the second action have a same importance level, an outline having the first modified color, wherein the outline encloses the first selectable foreground user interface element.

10. The computing device of claim 9, wherein the instructions, when executed by the one or more processors, further cause the computing device to:
receive one or more user inputs that indicate the first modified color; and
based on receiving the one or more user inputs that indicate the first modified color, output, for display, a preview of the non-selectable background user interface element having the first modified color.

11. The computing device of claim 9, wherein the instructions, when executed by the one or more processors, further cause the computing device to:
receive one or more user inputs that indicate the second modified color; and
based on receiving the one or more user inputs that indicate the second modified color, output, for display, a preview of the outline, wherein the preview of the outline has the second modified color.

12. The computing device of claim 9, wherein the instructions, when executed by the one or more processors, further cause the computing device to:
determine a thickness of the outline; and
based on the thickness, scale the first selectable foreground user interface element.

13. The computing device of claim 9, wherein the second modified color contrasts with the first modified color.

14. The computing device of claim 9, wherein the instructions, when executed by the one or more processors, further cause the computing device to:
determine that the user has not performed the second action;
based on determining that the user has not performed the second action:
determine a third modified color, wherein the third modified color is different from the first modified color and the second modified color; and
change the outline to have the third modified color.

15. The computing device of claim 9, wherein the instructions, when executed by the one or more processors, further cause the computing device to:
determine that the user has performed the second action;
based on determining that the user has performed the second action:
remove the outline around the first selectable foreground user interface element; and
scale the first selectable foreground user interface element based on having removed the outline.

16. The computing device of claim 9, wherein the instructions, when executed by the one or more processors, further cause the computing device to:
receive, from at least one server:
an indication of the first modified color associated with the importance of the first action; and
an indication of the second modified color associated with the second action;
determine the first modified color based on the received indication of the first modified color; and
determine the second modified color based on the received indication of the second modified color.

17. A non-transitory computer-readable medium storing instructions that, when executed by one or more processors, cause a computing device to:
determine, using an application, that a user has been successfully authenticated with the application;
receive, at a first time and from at least one server device, one or more indication of:
a first modified color associated with a first importance level; and
a second modified color associated with a second importance level,
wherein the second importance level is different from the first importance level;
output, at a second time after the first time, and for display via a graphical user interface (GUI):
a non-selectable background user interface element having a first default color, wherein the non-selectable background user interface element is associated with a first action having the first importance level;
a first selectable foreground user interface element having a second default color, wherein the first selectable foreground user interface element is associated with a second action having the second importance level; and
a second selectable foreground user interface element having a third default color; and
update, after a first time delay period has elapsed since the second time, for display via the GUI, and irrespective of whether the first action and the second action are performed:
the non-selectable background user interface element by gradually changing the non-selectable background user interface element from the first default color to the first modified color;
the first selectable foreground user interface element by gradually changing the first selectable foreground user interface element from the second default color to the second modified color; and the second selectable foreground user interface element, based on a determination that no action above a predetermined importance level is associated with the second selectable foreground user interface element, by gradually increasing transparency of the second selectable foreground user interface element having the third default color.

18. The non-transitory computer-readable medium of claim 17, wherein the instructions, when executed by the one or more processors, further cause the computing device to:

determine that the first modified color and the second modified color are similar to each other; and based on the determination that the first modified color and the second modified color are similar, change the second modified color to a different color that is not similar to the first modified color.

19. The non-transitory computer-readable medium of claim 17, wherein the instructions, when executed by the one or more processors, further cause the computing device to:

receive an indication, from the at least one server device, that the first action having the first importance level has been taken by the user; and based on receiving the indication that the user has taken the first action having the first importance level, remove the first modified color from the non-selectable background user interface element.

20. The non-transitory computer-readable medium of claim 17, wherein the instructions, when executed by the one or more processors, further cause the computing device to:

based on the first modified color, of the non-selectable background user interface element:

determine the second modified color, of the first selectable foreground user interface element, wherein the first modified color, of the non-selectable background user interface element does not blend in with the second modified color, of the first selectable foreground user interface element.

* * * * *